US012283165B2

(12) United States Patent
Gao et al.

(10) Patent No.: US 12,283,165 B2
(45) Date of Patent: *Apr. 22, 2025

(54) VISUAL RECOGNITION AND SENSOR FUSION WEIGHT DETECTION SYSTEM AND METHOD

(71) Applicant: Maplebear Inc., San Francisco, CA (US)

(72) Inventors: Lin Gao, Miami, FL (US); Shiyuan Yang, Shanghai (CN)

(73) Assignee: Maplebear Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/408,893

(22) Filed: Jan. 10, 2024

(65) Prior Publication Data

US 2024/0144789 A1 May 2, 2024

Related U.S. Application Data

(63) Continuation of application No. 17/323,031, filed on May 18, 2021, now Pat. No. 11,908,290, which is a
(Continued)

(51) Int. Cl.
*G01G 19/415* (2006.01)
*A47F 9/04* (2006.01)
(Continued)

(52) U.S. Cl.
CPC ............. *G07G 1/14* (2013.01); *A47F 9/048* (2013.01); *G01G 19/415* (2013.01); *G01G 21/22* (2013.01);
(Continued)

(58) Field of Classification Search
CPC .. G01G 19/415; G01G 19/4144; G01G 21/22; G07G 1/14; G07G 1/0072;
(Continued)

(56) References Cited

U.S. PATENT DOCUMENTS 4,258,812 A 3/1981 Pfeiffer
5,254,992 A 10/1993 Keen et al.
(Continued)

OTHER PUBLICATIONS

Canadian Intellectual Property Office, Office Action, Canadian Patent Application No. 3,065,615, Mar. 24, 2023, 3 pages.
(Continued)

*Primary Examiner* — Randy W Gibson
(74) *Attorney, Agent, or Firm* — Fenwick & West LLP

(57) ABSTRACT

Disclosed are visual recognition and sensor fusion weight detection system and method. An example method includes: tracking, by a sensor system, objects and motions within a selected area of a store; activating, by the sensor system, a first computing device positioned in the selected area in response to detecting a presence of a customer within the selected area: identifying, by the sensor system, the customer and at least one item carried by the customer; transmitting, by the sensor system, identifying information of the customer and the at least one item to a computing server system via a communication network; measuring, by the first computing device, a weight of the at least one item; transmitting, by the first computing device, the weight to the computing server system via the communication network; and generating, by the computing server system, via the communication network, transaction information of the at least one item.

20 Claims, 4 Drawing Sheets

Related U.S. Application Data continuation of application No. 16/229,336, filed on Dec. 21, 2018, now Pat. No. 11,017,641.

(51) Int. Cl.
| | |
|---|---|
| *G01G 21/22* | (2006.01) |
| *G06Q 20/20* | (2012.01) |
| *G06V 20/20* | (2022.01) |
| *G06V 20/40* | (2022.01) |
| *G07G 1/00* | (2006.01) |
| *G07G 1/14* | (2006.01) |
| *G06V 20/52* | (2022.01) |
| *G06V 20/68* | (2022.01) |

(52) U.S. Cl.
CPC ........... *G06Q 20/208* (2013.01); *G06V 20/44* (2022.01); *G07G 1/0072* (2013.01); *G06V 20/52* (2022.01); *G06V 20/68* (2022.01)

(58) Field of Classification Search
CPC ...... A47F 9/048; G06Q 20/208; G06V 20/44; G06V 20/52; G06V 20/68
See application file for complete search history.

(56) References Cited

U.S. PATENT DOCUMENTS

| | | | |
|---|---|---|---|
| 5,967,264 A | 10/1999 | Lutz et al. | |
| 6,373,237 B1 | 4/2002 | Oldendorf et al. | |
| 6,982,388 B2 | 1/2006 | Kasinoff | |
| 9,911,290 B1 | 3/2018 | Zalewski et al. | |
| 10,157,413 B2 | 12/2018 | Landers et al. | |
| 10,745,039 B1 | 8/2020 | Gao et al. | |
| 11,501,523 B2 | 11/2022 | Li et al. | |
| 2010/0002902 A1 | 1/2010 | Landers et al. | |
| 2013/0056286 A1 | 3/2013 | Watabe et al. | |
| 2014/0036630 A1 | 2/2014 | Herwig | |
| 2014/0126772 A1 | 5/2014 | Miyakoshi | |
| 2014/0229343 A1 | 8/2014 | Higgins et al. | |
| 2014/0316916 A1 | 10/2014 | Hay | |
| 2015/0269549 A1 | 9/2015 | Herring et al. | |
| 2015/0339650 A1 | 11/2015 | Moro | |
| 2016/0110786 A1 | 4/2016 | Herring et al. | |
| 2016/0180315 A1 | 6/2016 | Kanamori | |
| 2016/0351023 A1 | 12/2016 | Takeno et al. | |
| 2017/0068945 A1 | 3/2017 | Tsuchimochi et al. | |
| 2019/0042851 A1 | 2/2019 | Varadarajan et al. | |
| 2020/0167571 A1 | 5/2020 | Tsunashima | |
| 2020/0202137 A1 | 6/2020 | Li et al. | |
| 2021/0199489 A1 | 7/2021 | Zhu et al. | |
| 2021/0248579 A1 | 8/2021 | Moritz et al. | |
| 2021/0374836 A1 | 12/2021 | Bronicki et al. | |
| 2022/0114868 A1 | 4/2022 | Bronicki et al. | |
| 2022/0252448 A1 | 8/2022 | Zhang et al. | |

OTHER PUBLICATIONS

United States Office Action, U.S. Appl. No. 16/229,336, filed Oct. 20, 2020, 8 pages.

United States Office Action, U.S. Appl. No. 18/408,893, filed Jun. 6, 2023, 11 pages.

VISUAL RECOGNITION AND SENSOR FUSION WEIGHT DETECTION SYSTEM AND METHOD

CROSS-REFERENCE TO RELATED APPLICATION

This application is a continuation of U.S. patent application Ser. No. 17/323,031, filed May 18, 2021, which is a continuation of U.S. patent application Ser. No. 16/229,336, filed on Dec. 21, 2018, now issued as U.S. Pat. No. 11,017,641, each of which is incorporated by reference in its entirety.

TECHNICAL FIELD

The present disclosure relates generally to a detection system using visual recognition and sensor fusion to record accurate weight reading of goods in, e.g., a physical retail environment.

BACKGROUND

Currently, an increasing number of convenience stores, grocery markets and retail outlets are exploring various form factors to enable cashier-less retail. As a result, grocers can save cashier labour while helping to reduce customer wait time.

In order to provide a holistic experience for a cashier-less grocery shopping, weighed goods—such as produce and deli—must be accounted for during customer's shopping journey. Currently, no visual-based systems exist to identify the weight of the items being picked up.

Accordingly, there is a need for the use of sensor-fused system, combined with visual recognition system to enable an environment where weighed goods can be accounted for during the implementation of cashier-less retail system in convenience stores, grocery markets and/or retail outlets.

SUMMARY

Among other things, the present disclosure provides a system deployed within a communication network. The system comprises: a first computing device positioned within a selected area of a store; a sensor system configured to: track objects and motions within the selected area, activate the first computing device in response to detecting a presence of a customer within the selected area, and identify the customer and at least one item carried by the customer; and a computing server system configured to communicate with the first computing device and the sensor system via the communication network, wherein the first computing device is activated by the sensor system to measure the weight of the at least one item and transmit the weight to the computing server system, the sensor system is configured to transmit identifying information of the customer and the at least one item to the computing server system, and the computing server system is configured to generate transaction information of the at least one item.

In one aspect, the computing server system is configured to determine the transaction information based at least upon the weight of the at least one item and the identifying information of the customer and the at least one item.

The system further comprises a second computing device configured to facilitate a transaction of the at least one item, wherein the computing server system is configured to: receive a transaction request of the at least one item from the second computing device via the communication network; and transmit the transaction information to the second computing device in response to the transaction request of the at least one item. The sensor system comprises at least one camera or sensor. The sensor system is configured to generate and transmit at least one signal to activate the computing device when the at least one camera or sensor detects the presence of the customer within the selected area for at least a defined period of time.

In another aspect, the computing server system is configured to at least store the weight of the at least one item and the identifying information of the customer and the at least one item. The communication network comprises a cloud computing and communication network.

Among other things, the present disclosure provides a method. The method comprises tracking, by a sensor system, objects and motions within a selected area of a store; activating, by the sensor system, a first computing device positioned in the selected area in response to detecting a presence of a customer within the selected area; identifying, by the sensor system, the customer and at least one item carried by the customer; transmitting, by the sensor system, identifying information of the customer and the at least one item to a computing server system via a communication network; measuring, by the first computing device, a weight of the at least one item: transmitting, by the first computing device, the weight to the computing server system via the communication network; and generating, by the computing server system, via the communication network, transaction information of the at least one item.

In one aspect, the method further comprises determining, by the computing server system, the transaction information based at least upon the weight of the at least one item and the identifying information of the customer and the at least one item; providing a second computing device within the store to facilitate a transaction of the at least one item; receiving, by the computing server system, a transaction request of the at least one item from the second computing device via the communication network; and transmitting, by the computing server system, the transaction information to the second computing device in response to the transaction request of the at least one item. In one aspect, the sensor system comprises at least one camera or sensor.

The method further comprises generating and transmitting, by the sensor system, at least one signal to activate the first computing device in response to detecting, by the at least one camera or sensor, the presence of the customer within the selected area for at least a defined period of time. The method further comprises storing, by the computing server system, at least the weight of the at least one item and the identifying information of the customer and the at least one item. The communication network comprises a cloud computing and communication network.

Among other things, the present disclosure provides a non-transitory computer readable medium storing computer executable instructions for a system deployed in a communication network, the instructions being configured for: tracking, by a sensor system, objects and motions within a selected area of a store; activating, by the sensor system, a first computing device positioned in the selected area in response to detecting a presence of a customer within the selected area; identifying, by the sensor system, the customer and at least one item carried by the customer: transmitting, by the sensor system, identifying information of the customer and the at least one item to a computing server system via a communication network; measuring, by the first computing device, a weight of the at least one item;

transmitting, by the first computing device, the weight to the computing server system via the communication network; and generating, by the computing server system, via the communication network, transaction information of the at least one item.

In one aspect, the non-transitory computer readable medium further comprises instructions configured for deploying a second computing device within the store to facilitate a transaction of the at least one item; determining, by the computing server system, the transaction information based at least upon the weight of the at least one item and the identifying information of the customer and the at least one item; receiving, by the computing server system, a transaction request of the at least one item from the second computing device via the communication network; and transmitting, by the computing server system, the transaction information to the second computing device in response to the transaction request of the at least one item.

In an aspect, the sensor system comprises at least one wireless camera or sensor.

In another aspect, the non-transitory computer readable medium further comprises instructions for: generating and transmitting, by the sensor system, at least one signal to activate the first computing device in response to detecting, by the at least one camera or sensor, the presence of the customer within the selected area for at least a defined period of time; and storing, by the computing server system, at least the weight of the at least one item and the identifying information of the customer and the at least one item. The communication network comprises a cloud computing and communication network.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
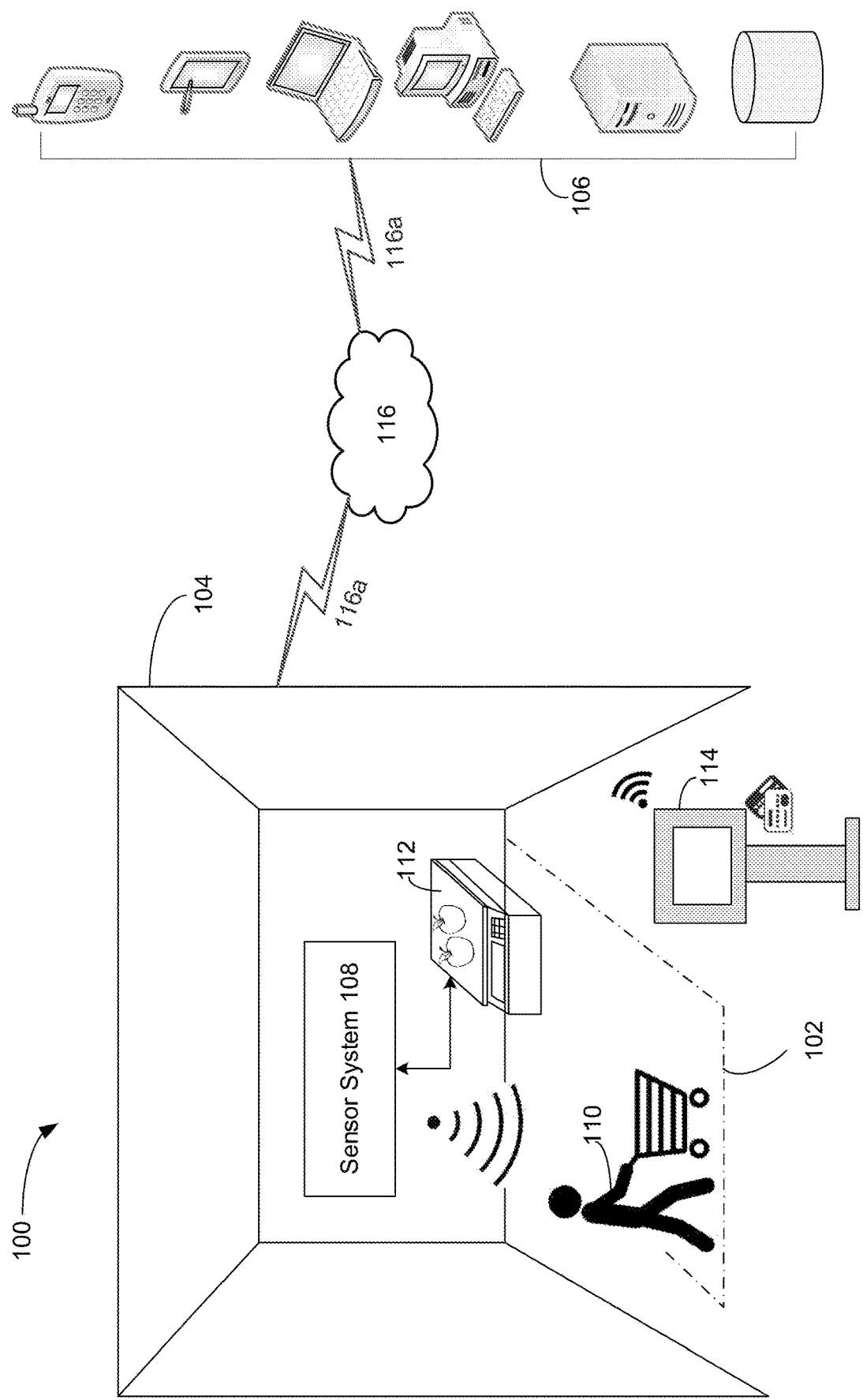
FIG. 1 illustrates a visual recognition and sensor fusion weight detection system, according to an exemplary aspect of the present disclosure.

Disclosed herein are exemplary aspects of a visual recognition and sensor fusion weight detection system and method. Various aspects of invention will be described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below.

Currently, an increasing number of convenience stores, grocery markets and retail outlets are exploring various form factors to enable cashier-less retail. As such, grocers may save cashier labour while helping reduce customer wait time. As will be described below, the present application discloses a computer vision enabled system for facilitating a cashier-less retail experience. Among other features, the disclosed computer vision system may be configured to track customer movements within a store and identify items as they are being picked up from a shelf. Further, in order to provide a holistic experience for a cashier-less grocery shopping, weighed goods—such as produce and deli—must be accounted for during a customer's shopping journey. Conventional camera-based systems may identify customers and items visually, but fail to identify the weight of the items being picked up by a customer. The present application details the implementation of a sensor-fused system, combined with computer visual recognition techniques to enable a cashier-less retail environment in convenience stores, grocery markets and/or retail outlets where weighed goods may be accounted for.

According to aspects of the present application, FIG. 1 illustrates a visual recognition and sensor fusion weight detection system 100 that may be implemented as a holistic camera-enabled cashier-less retail system in any department store, grocery store, convenience and liquor store, or retail store or warehouse. System 100 may be configured to continuously monitor at least one selected region or area 102 within a retail environment 104, detect motions and objects within such area 102 in real time, determine a weight of an item that is brought into the area 102 via visual recognition combined with sensor fusion, and exchange information with a computing server system 106 for completing a transaction of the item. For example, system 100 may comprise a sensor system 108 having a plurality of sensors and/or cameras installed throughout the retail environment 104 including area 102 for monitoring, identifying and tracking various people, objects and devices therein in real time. Specifically, the selected area 102 may be a visually-designated area parameterized with computer vision algorithms and/or at least a portion of the plurality of sensors and/or cameras of sensor system 108, including but not limited to companioned camera, infrared, weight sensors, Bluetooth, Beacon, Zigbee and the like. When a customer 110 or device (a computing device mounted a shopping cart) tracked by sensor system 108 is detected to be within a selected distance near a computing device 112 inside area 102, sensor system 108 may be configured to generate and transmit signals to the computing server system 106 to indicate such detection. In the meantime, at least one control signal may be generated and transmitted by sensor system 108 to activate computing device 112. Specifically, computing device 112 may be configured to measure a weight of an item and communicate various information and signals directly or indirectly with the computing server system 106. Further, one or more computing devices 114 (e.g., payment terminals) may be installed throughout retail environment 104, such that a customer may complete a transaction using any suitable payment methods (e.g., credit cards or mobile payment).

System 100 may employ a computing architecture either locally based or cloud based. On a high level, as shown in FIG. 1, each computing device within the retail environment 104 may be configured to communicate with the computing server system 106 via a communication network 116 using suitable network connections and protocols 116a. A computer network may refer to a geographically distributed collection of computing devices or data points interconnected by communication links and segments for transporting signals and data there between. A protocol may refer to a set of rules defining how computing devices and networks may interact with each other, such as frame relay, internet protocol (IP), transmission control protocol (TCP), user datagram protocol (UDP), hypertext transfer protocol (HTTP). Many types of networks are available, ranging from local area networks (LANs), wide area networks (WANs), cellular network, to overlay networks and software-defined networks (SDNs), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other suitable network.

For example, communication network 116 may be a LAN configured to connect each and all computing devices deployed within the retail environment 104 over dedicated private communications links located in the same general physical location, i.e., the retail environment 104. Communication network 116 may be a WAN configured to connect computing devices deployed within the retail environment 104 and other geographically dispersed computing devices and networks over long-distance communications links, such as common carrier telephone lines, optical light paths, synchronous optical networks (SONET), or synchronous digital hierarchy (SDH) links. The Internet may be used to connect disparate devices and networks throughout the world, providing global communication among nodes (a node of an Internet has an IP address) on various networks. These nodes may communicate over the communication network 116 by exchanging discrete frames or packets of data according to protocols 116a, such as the TCP/1P. Communication network 116 may be further interconnected by an intermediate network node, such as a router and gateway device, to extend the effective size of each network.

In another embodiment, communication network 116 may include an overlay network configured to generally allow virtual networks to be created and layered over a physical network infrastructure. For example, network connections and protocols 116a may include overlay network protocols, such as virtual extensible LAN (VXLAN). Network virtualization may allow hardware and software resources to be combined in a virtual network. For example, network virtualization may allow multiple numbers of virtual machines (VMs) to be attached to communication network 116 via respective virtual LANs (VLANs). The VMs may be grouped according to their respective VLAN, and may communicate with other VMs as well as other devices on the internal or external networks.

In another embodiment, system 100 may employ a cloud-based communication network 116 for providing computing services using shared resources. Cloud computing may generally include Internet-based computing in which computing resources are dynamically provisioned and al located to each connected computing device or other devices on-demand, from a collection of resources available via the network or the cloud. Cloud computing resources may include any type of resource, such as computing, storage, and networking. For instance, resources may include service devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, VMs, databases, applications, etc.

Cloud computing resources accessible by communication network 116 may include a private cloud, a public cloud, and/or a hybrid cloud. For example, a private cloud may be a cloud infrastructure operated by an enterprise for use by the enterprise, while a public cloud may refer to a cloud infrastructure that provides services and resources over a network for public use. In a hybrid cloud computing environment which uses a mix of on-premises, private cloud and third-party, public cloud services with orchestration between the two platforms, data and applications may move between private and public clouds for greater flexibility and more deployment options. For instance, when communication network 116 uses a hybrid cloud architecture, high-volume lower-security operations such as web-based emails may be implemented on a public cloud, while sensitive, business-critical operations like processing customer financial information may be performed using a private cloud. Further, in a hybrid cloud, "cloud bursting" may be an option. For example, an application or resource (e.g., a user, service, system, device, directory, data store, groups of users, or combinations thereof) associated with the retail environment 104 (e.g., one or more payment terminals 114) may operate in a private cloud until there is a spike in demand (e.g., seasonal events like holiday shopping), and communication network 116 of the retail environment I 04 may "burst through" to a public cloud to tap into additional computing resources.

Depending upon the computing architecture used by system 100, a remotely or locally deployed computing server system 106 may comprise at least one of personal computers, servers, server farms, laptops, tablets, mobile devices, smart phones, cellular devices, portable gaming devices, media players, network enabled printers, routers, wireless access points, network appliances, storage systems, gateway devices, or any other suitable devices that are deployed in the same or different networks. As will be described fully blow, computing server system 106 may be configured to provide functionalities fix any connected devices such as sharing data or resources among multiple client devices, or performing computations for each connected client device.

Figure 2:
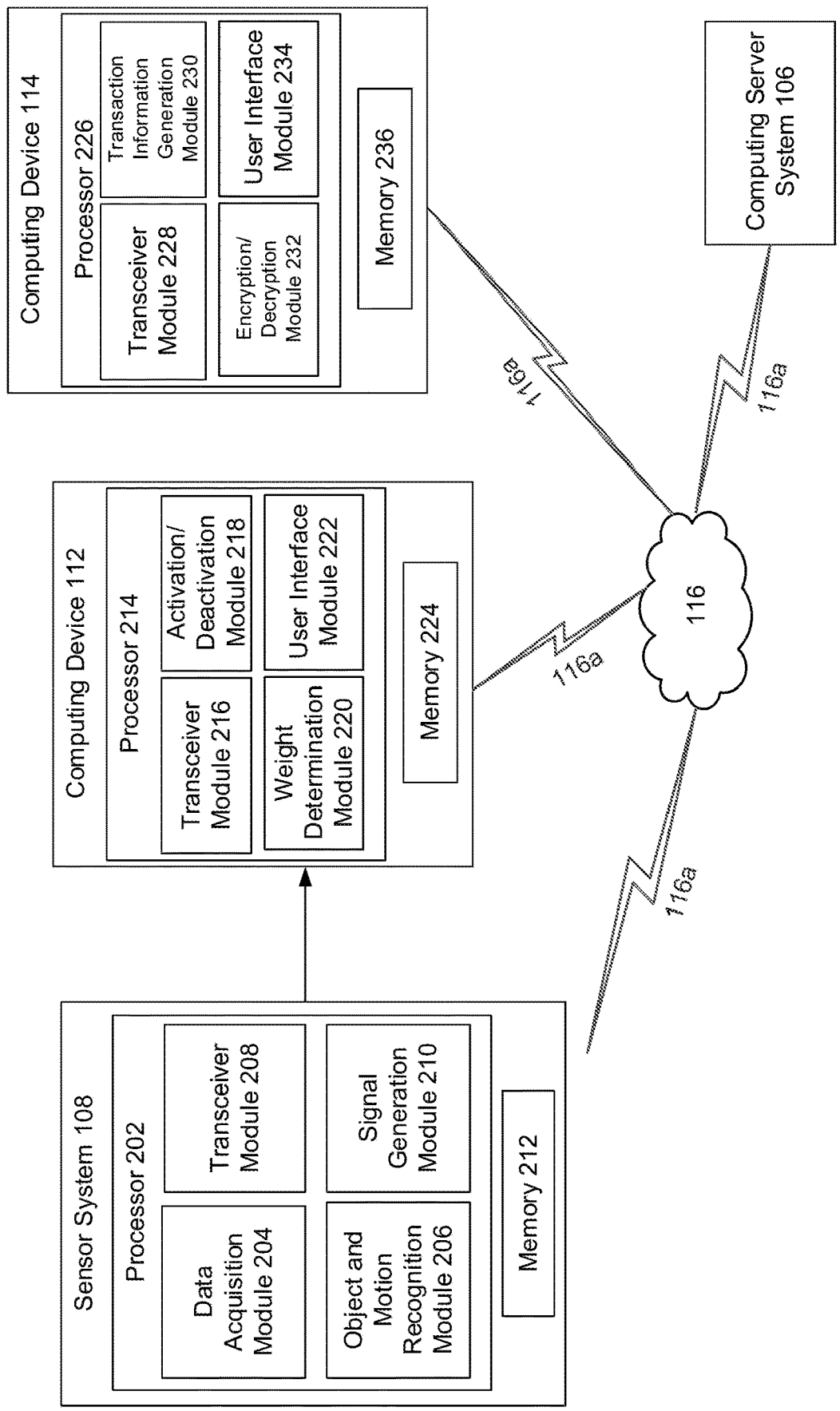
FIG. 2 illustrates a system diagram of the visual recognition and sensor fusion weight detection system, according to an exemplary aspect of the present disclosure.

Referring to FIG. 2, sensor system 108 of system 100 may include at least one processor 202 configured to control and execute a plurality of modules including a data acquisition module 204, an object and motion recognition module 206, a transceiver module 208, and a signal generation module 210. When a customer is detected, via data acquisition module 204, to present in the selected area 102 and/or remain in the area 102 for a defined period of time, at least one control signal may be generated by signal generation module 210 to activate the computing device 112 for measuring and recording the weight of an item intended to be weighed on a scale by the customer. Moreover, identifying information relating to the people and objects detected within the area 102 may be transmitted from the object and motion recognition module 206 to the computing server system 106 via the transceiver module 208.

The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

Memory 212, which is coupled to the processor 202, may be configured to store at least a portion of information obtained by sensor system 108. In one aspect, memory 212 may be a non-transitory machine readable medium configured to store at least one set of data structures or instructions (e.g., software) embodying or utilized by at least one of the techniques or functions described herein. It should be appreciated that the term "machine readable medium" may include a single medium or multiple media (e.g., a centralized or distributed database, and/or associated caches) configured to store the at least one instruction. The term "machine readable medium" may include any medium that is capable of storing, encoding, or carrying instructions for execution by all modules of sensor system I 08 and that cause these modules to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks: Random Access Memory (RAM); Solid State Drives (SSD); and CD-ROM and DVD-ROM disks.

In accordance with aspects of the present application, data acquisition module 204 of sensor system 108 may comprise a plurality of cameras and/or sensors configured to monitor and track objects and motions in area 102 in real time. For example, data acquisition module 204 may use one or more sensors to detect locations of people presented in the area 102. Captured information and images may be stored in memory 212 and analyzed by object and motion recognition module 206 for identification of people and objects in the area 102.

In one embodiment, to identify items brought into the area 102 by a customer for purchase, sensor system 108 may be initially provided and continuously updated with training data such as physical characteristics such as specific color, shape and packaging associated with each item that is for sale in retail environment 104. In response to detecting that a customer carrying items into the area 102 by the data acquisition module 204, object and motion recognition module 206 may operate in a recognition mode with respect to these items. For example, at least one camera and/or sensor of data acquisition module 204 may capture an image of an item (e.g., apples shown in FIG. 1), and characteristics associated with the item may be compared against those in memory 212 or a database connected with sensor system 108 via the communication network 116 containing the training data. If there is a sufficient degree of correlation, then the item may be considered recognized.

To identify a customer presented in area 102, data acquisition module 204 may detect the locations of the customer in relation to the location of computing device 112, and capture at least one image of the customer (e.g., a frontal facial view) when the customer is within a selected distance of computing device 112. Thereafter, object and motion recognition module 206 may generate a unique identifier for the customer in connection with the image and associate additional characteristics obtained from other captured images of the customer with the unique identifier.

Alternatively, sensor system 108 may have a plurality of sensors and/or cameras installed throughout the retail environment 104 for monitoring, identifying and tracking various people, objects and devices therein in real time, such that training data and a unique identifier regarding each specific customer may be generated by object and motion recognition module 206 when the customer enters and walks around the retail environment 104. When the customer presents in area 102, object and motion recognition module 206 may continuously analyze information collected within area 102 and associate additional characteristics with the same customer. In one aspect, as a continuous self-learning system, sensor system 108 may be configured to continue accumulating information about the same customer in the retail environment 104 at different times and locations in connection with the unique identifier prior to the final check out by the customer. For example, sensor system 108 may detect additional characteristics of a customer (e.g., wearing glasses or wearing a baseball cap) and surrounding objects obtained inside or outside the selected area 102 to assist in identifying the customer. When multiple people are detected to present within area 102, sensor system 108 may either leverage gesture recognition or use a multitude of sensors to identify which person within the area 102 has initiated a weighing action of an item.

Further, object and motion recognition module 206 may apply a weight to each detected characteristic of a customer. For example, facial features may carry a greater weight than color and texture details of upper body clothes of a person. An identification confidence level or threshold for each customer presented in area 102 may be determined by object and motion recognition module 206 in connection with a total weight of all detected characteristics. For example, data acquisition module 204 may capture information (e.g., an image or a video feed) of a customer within the area 102, and object and motion recognition module 206 may extract various facial and/or body features/attributes of the customer from the information, determine and apply a weight for each attribute, and determine a total weight of all extracted attributes. The weight of an attribute may be a function of the uniqueness of the attribute. For example, if a particular customer is detected to wear a tattoo on his arm, such a tattoo may significantly increase the confidence level for recognition of the customer. Similarly, with regard to clothing, a uniqueness attribute may be based on a logo, pattern, number, words, or any attribute that may facilitate distinguishing an article of clothing from another.

When the total weight of all detected attributes has been detected to equal to or exceed a defined identification threshold, the customer may be deemed as uniquely and unambiguously identified. However, if the total weight is less than the defined identification threshold, additional characteristic of the customer may be continuously detected, analyzed, associated with the unique identifier of the customer, and compared with the defined identification threshold. In one aspect, with regard to image data collected by at least one camera of data acquisition module 204, object and motion recognition module 206 may analyze individual image frames, such as taken with an imaging device in a snapshot mode or video frame stills, and/or consider motion information from video, such as a customer's gait, hand gestures, or other mannerisms obtainable from multi-media information. For example, if a person walks with a limp, object and motion recognition module 206 may recognize that fact and utilize the information in establishing a higher confidence level in the recognition. In another aspect, data acquisition module 204 may be configured to include one or more audio capturing sensors or apparatus (e.g., microphones) installed in the area 102, such that voice samples of a specific customer may be analyzed by object and motion recognition module 206 using suitable voice and speech recognition techniques and associated with the unique identifier of the customer.

As further shown in FIG. 2, the computing device 112 may include at least one processor 214 configured to control and execute a plurality of modules including a transceiver module 216, an activation and deactivation module 218, a weight determination module 220, a user interface module 222, and memory 224 coupled to processor 214. As described previously, computing device 112 may be activated by a control signal received from sensor system 108 via transceiver module 216 when a customer is detected to present in the selected area 102 and/or remain in the area 102 for a defined period of time. For example, the control signal may be generated in response to at least detecting the location of the customer is within a selected range or distance to the location of the weight determination module 220. Further, processor 214 may be configured to support various power management modes of the computing device 112 based at least upon the generated control signal. For example, computing device 112 may have several power modes: a full power or ON mode in which normal full functionality of the device is provided; a sleep mode in which reduced functionality of the device is provided; and an OFF mode in which the device is powered off and performs no functions. Processor 214 of computing device 112 may be configured to monitor one or more predetermined trigger conditions for transitioning among different power modes. These trigger conditions may include any one or more of: a selection of a specific power mode in response to a corresponding input, user inactivity for a predetermined duration, lack of wireless network coverage for a predetermined duration, the control signal received from sensor system 108, or other suitable trigger condition. In one aspect, computing device 112 may include one or more clocks such as a high power clock and a low power clock (both not shown). Alternatively, a single clock of computing device 112 may operate as both high power and low power clocks. Each clock may comprise a voltage controlled oscillator operating in a selected frequency range. In response to detection of a trigger condition, processor 214 may be configured to schedule ON and OFF time of computing device 112 in accordance with a programmable duty cycle for achieving a balance between power consumption and response latency. For example, to reduce the power and resources consumed by computing device 112, processor 214 may initiate the lower power clock to operate certain circuitry at a reduced duty cycle in a sleep mode, until it detects and receives the control signal from sensor system 108. Thereafter, processor 214 may switch to the high power clock and computing device transitions to the full power or ON mode.

When the customer has placed an item on the computing device 112 for a weight measurement, the weight determination module 220 of computing device 112 may be configured to record and communicate the item weight to the computing server system I 06 via communication network 116. In the meantime, one or more cameras or sensor of sensor system 108 monitoring the area 102 may be configured to identify the weighed item through various techniques of computer vision or a visually/wirelessly identifier, which may include but not limited to a bar code, universal product code (UPC), quick response (QR) code, numeric code, alphanumeric code, or any other two-dimensional (2D) image code or three-dimensional (3D) image code Radio Frequency Identification (RFID) and the like. User interface module 222 of computing device 112 may be configured to facilitate a set of user interactions, such as receiving a user input, displaying an interface through which an application may be viewed and controlled, and displaying certain information relating to the item being weighted and the transaction thereof. Memory 224, coupled to processor 214, may be configured to locally store data or executable instructions associated with the plurality of modules of computing device 112.

In another embodiment, when the customer has placed an item on the activated computing device 112 in an attempt to obtain a reading of the item weight, the item weight may be recorded and communicated to the computing server system 106 via communication network 116, but the identification of the weighed item may take place before checkout, either through various techniques of computer vision or scanning a visually/wirelessly identifier that may communicate to the computing server system. Such identifier may include but not limited to a bar code, universal product code (UPC), quick response (QR) code, numeric code, alphanumeric code, or any other two-dimensional (2D) image code or three-dimensional (3D) image code, Radio Frequency Identification (RFID) and the like.

In one aspect, the weight determination module 220 of computing device 112 may be configured to derive the weight of an item to be weighted. For example, the item may be positioned on the computing device 112 prior to or contemporaneous with the activation of the computing device 112. When the item is picked up and removed from the computing device 112, the weight determination module 220 may be configured to detect a decrease in total weight, and use a subtraction method to derive the weight of the item.

The recorded weight of the item, along with the identification of the item, may subsequently be mapped with the customer who has initiated the weighing action by the computing server system 106. In one aspect, the mapping may be passed from one person to another person if a transfer action of the final checkout of the item is detected via object and motion recognition module 206.

In addition, as shown in FIG. 2, one or more computing devices 114 (e.g., payment terminals) may be installed throughout retail environment 104 to facilitate a transaction of the item using any suitable payment methods (e.g., credit cards or mobile payment). In accordance with aspects of the present application, computing device 114 may include at least one processor 226 configured to control and execute a plurality of modules including a transceiver module 228, a transaction information generation module 230, an encryption/decryption module 232, a user interface module 234, and memory 236 coupled to processor 226. As will be described below in connection with FIG. 3, computing device 114 may be configured to integrate with a cloud-based visual recognition and sensor fusion weight detection computing platform 300 to securely process payment transactions.

Figure 3:
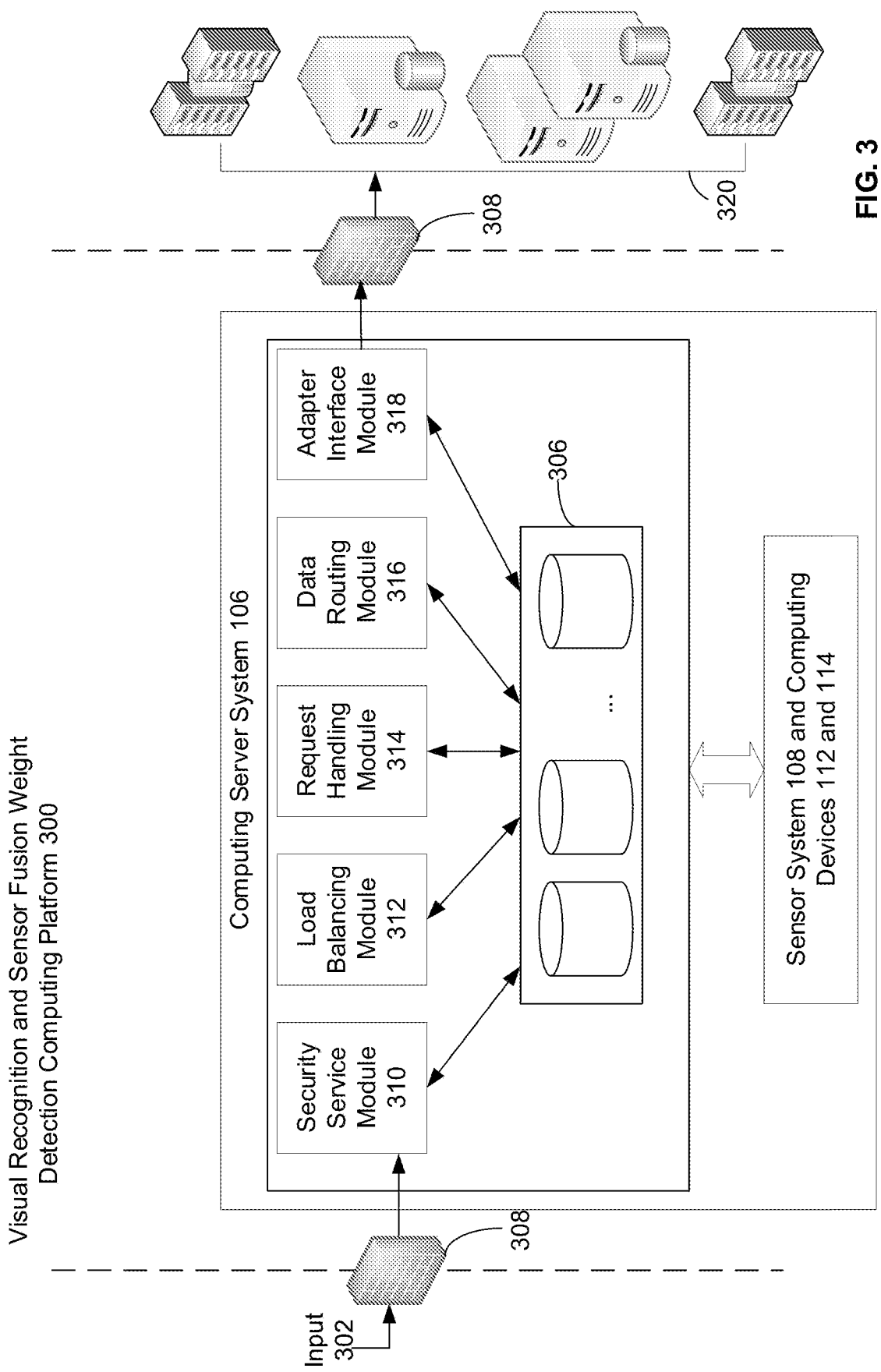
FIG. 3 illustrates a visual recognition and sensor fusion weight detection computing platform, according to an exemplary aspect of the present disclosure.

FIG. 3 shows a system architecture of a visual recognition and sensor fusion weight detection computing platform 300 using a cloud-based computing server system 106 for exchanging information among different entities including sensor system 108 and computing devices 112 and 114 deployed throughout the retail environment 104, according to aspects of the present application. On a high level, the computing server system 106 may be configured to facilitate on-demand delivery of compute power, database storage, software applications, and other IT resources through platform 300 via the Internet. The computing server system 106 may include multiple cloud servers concurrently running on a hypervisor to control the capacity of underlying operating systems and allocate processor cycles, memory space, network bandwidth and so on. Input 302 (e.g., a customer check out request) to the computing server system 106 may be obtained from transceiver module 228 of computing device 114.

In accordance with an aspect of the present application, the computing server system 106 may be configured to operate as a secure intermediary computing environment for real time or near real time data collection, storage, analysis in connection with the use of sensor system 108 and computing devices 112 and 114 described above. For example, the computing server system 106 may implement techniques to facilitate communications among various cameras, sensors, computing devices and cloud computing entities (cloud datacenters, cloud web servers, cloud application servers, cloud database servers, cloud storage devices) despite their incompatibilities in communication, such as differences between formats or communication protocols. For example, the computing server system 106 may be configured to translate communication protocols among different computing devices.

The computing server system 106 may be implemented using hardware, software, firmware, or combinations thereof. For example, the computing server system 106 may include one or more computing devices, such as a server computer, one or more memory storage devices 306, one or more processors, and operate with different kinds of operating systems. Each memory storage device may implement one or more databases (e.g., a document database, a relational database, or other type of database), one or more file stores, one or more file systems, or combinations thereof, and may include instructions stored thereon which, when executed by the processor(s), cause the processor(s) to implement one or more operations disclosed herein.

As shown in FIG. 3, the computing server system 106 may include a plurality of data repositories 306 that are accessible by a plurality of modules 310-318. For example, a first data repository may store all the metadata (e.g., run-time and design-time data, each having their own requirements on availability and performance) associated with the computing server system 106. A tenant or subscriber (e.g., computing device 112 or 114) of the computing server system 106 may have any number of applications installed thereon. Each application may be versioned and have at least one versioned resource application programming interface (API), and corresponding versioned service. The first data repository may store one or more callable interfaces, which may be invoked by the user interface module 234 via transceiver module 228. The callable interface may be implemented to translate between one format, protocol, or architectural style for communication and another format, protocol, or architectural style for communication. Further, a second data repository may be used to store information about processing occurring in the computing server system 106, such as messages communicated via the computing server system 106 and log information. Additional data repositories may be configured to store logging and analytics data captured during processing in the computing server system 106. Depending on the demand of various connected computing devices seeking to communicate with backend cloud resources 320, the computing server system 106 may be configured to handle surges and temporary periods of higher than normal traffic between each connected device and other cloud computing devices. For example, the computing server system 106 may include modules that support scalability such that components may be added or replaced to satisfy demand in communication.

Input 302 (e.g., a request for cloud service such as a check out request from computing device 114) may be communicated between the transceiver module 228 and the computing server system 106 via one or more callable interfaces, e.g., APIs. The computing server system 106 may be protected by one or more firewalls 308 to provide a secure environment to process requests from various computing devices. For example, firewalls 308 may permit communication of messages between the computing server system 106 and the computing device 114. Such messages (e.g., SPDY messages, hypertext transfer protocol (HTTP) messages or representational state transfer (REST) messages) may conform to a communication protocol (e.g., SPDY, HTTP, or REST). Input 302 that is received through the firewall 308 may be processed first by security service module 310 which is configured to manage security authentication for a user associated with a service request by at least restricting access to only those who have the required credentials to certain customer and transaction related data. In one aspect, encrypted payment information may be generated by encryption/decryption module 232 when a customer initiates a check out and payment process on computing device 114. For example, encrypted payment information may include customer financial account information. Security service module 310 may share public/private encryption keys to process payment information received from the computing device 114.

Upon determining security authentication, the computing server system 106 may use the load balancing module 312 to detect which cloud service 320 the received request is directed to, and use a request handling module 314 to transmit each service request to an appropriate cloud service 320. A request may be routed to an appropriate service 320 upon dispatch, or to another module of the computing server system 106. The request handling module 314 may resolve a request to determine its destination based on a location (e.g., a uniform resource identifier (URI) and/or a URL of the request). The request handling module 314 may parse a request's header to extract one or more of the following information: tenant device identifier, service identifier, application name, application version, request resource, operation and parameters, etc. The request handling module 314 may use the parsed information to perform a lookup in data repositories 306 and retrieve corresponding application metadata. The request handling module 314 may determine the target service based on the requested resource and the mappings in the stored metadata. For example, in accordance with aspects of the present application, in response to receiving identifying information of a customer and at least one item in area 102 from sensor system 108 and the weight of the at least one item from computing device 112, the computing server system 106 may establish an account for the customer and save received information from connected computing devices related to the customer and the at least one item. As a result, in processing a check out or transaction request from computing device 114, the computing server system 106 may be configured to lookup saved customer and item information and generate transaction information of the item accordingly. Via formatting the request and any other necessary information, the request handling module 314 may place the input message on data routing module 316 for further processing, or on a queue and await the corresponding response. The request handling module 314 may process responses received from the data routing module 316 and return a response to, e.g., computing device 114.

The data routing module 316 may manage delivery of messages to destinations registered with itself. The data routing module 316 may operate as a central system for managing communications m cloud services 320, such that additional centralized services (additional authorization, debugging, etc.) may be plugged in as necessary. Data captured by the data routing module 316 may be stored in the data repositories 306.

The data routing module 316 may route messages to one or more destinations 320 directly, or with the aid of an adapter interface module 318 by translating or converting a message to a protocol supported by a receiving cloud device 320. The adapter interface module 318 may establish separate communication connections with each of cloud resources 320.

Figure 4:
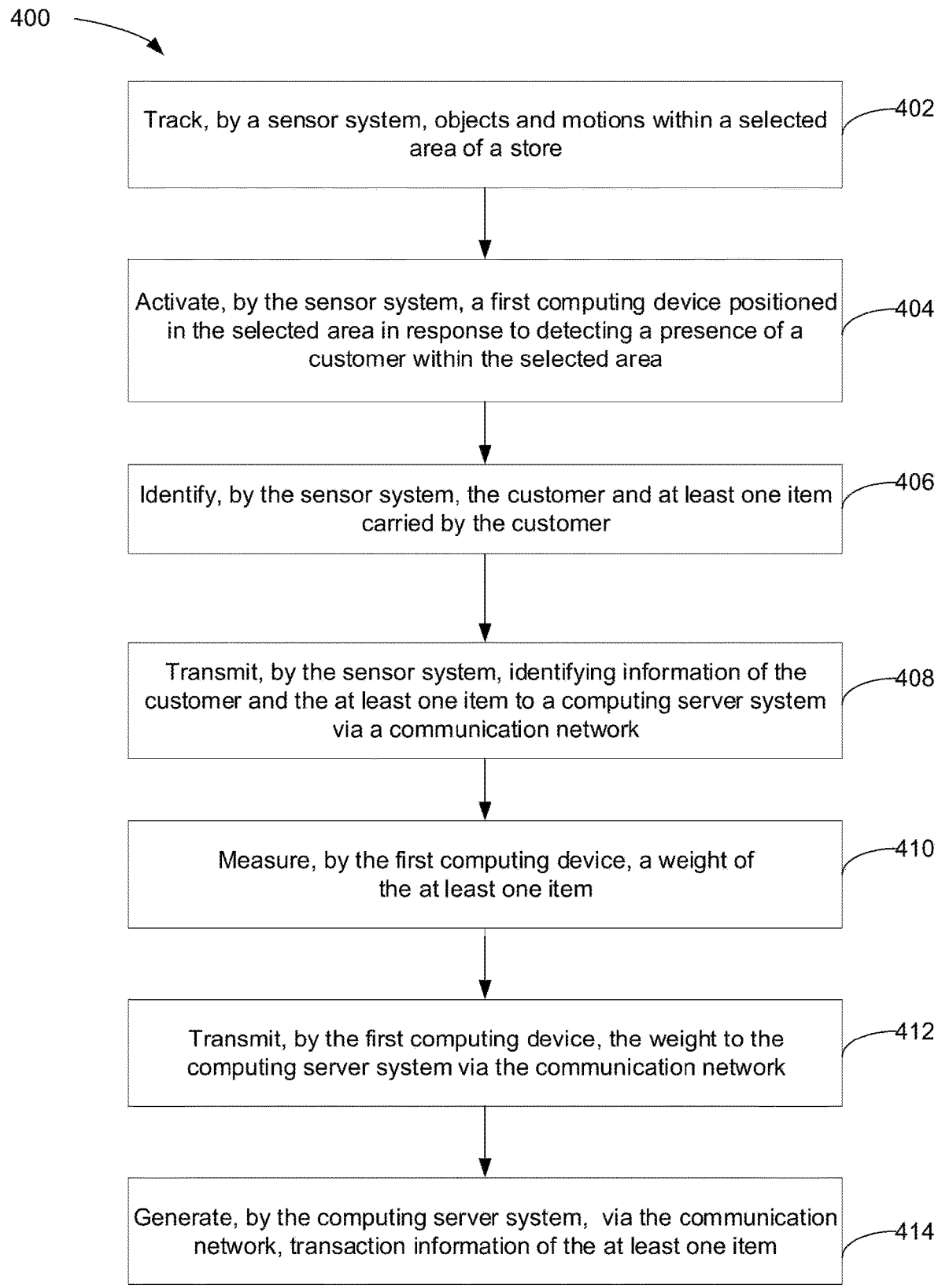
FIG. 4 illustrates a flow chart of a method implemented in the visual recognition and sensor fusion weight detection system of FIG. 1, according to an exemplary aspect of the present disclosure.

Referring to FIG. 4, a flow chart of a method 400 implemented in the visual recognition and sensor fusion weight detection system 100 of FIG. 1, is illustrated, according to aspects of the present disclosure. Among other things, the method comprises tracking (402), by a sensor system, objects and motions within a selected area of a store; activating (404), by the sensor system, a first computing device positioned in the selected area in response to detecting a presence of a customer within the selected area; identifying (406), by the sensor system, the customer and at least one item carried by the customer; transmitting (408), by the sensor system, identifying information of the customer and the at least one item to a computing server system via a communication network; measuring (410), by the first computing device, a weight of the at least one item; transmitting (412), by the first computing device, the weight to the computing server system via the communication network; and generating (414), by the computing server system, via the communication network, transaction information of the at least one item.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant alt(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method, performed by a computer system comprising a processor and a non-transitory computer-readable medium, comprising:
   detecting a location of a user within a region based on sensor data captured by a plurality of sensors of a weight detection system;
   determining that the user is within a threshold distance of a computing device of the weight detection system based on the detected location of the user;
   responsive to determining that the user is within the threshold distance of the computing device, activating the computing device to measure a weight of an item;
   weighing an item using the computing device;
   identifying the item based on the weight of the item and based on an image captured by a camera of the weight detection system; and
   transmitting identifying information of the item to a computing server system of the of the weight detection system via a communication network.

2. The method of claim 1, wherein determining that the user is within the threshold distance of the computing device comprises:
   determining that the user is within the threshold distance of the computing device for a threshold period of time.

3. The method of claim 1, wherein the region is a selected area within a store.

4. The method of claim 3, wherein the selected area within the store is a visually-designated area within the store.

5. The method of claim 1, wherein the plurality of sensors comprises a weight sensor or an infrared sensor.

6. The method of claim 1, wherein detecting the location of the user comprises:
   applying a visual recognition algorithm to an image captured by a camera.

7. The method of claim 1, wherein the computing device is a device that is coupled to a shopping cart.

8. The method of claim 1, further comprising:
   identifying the user based on the sensor data captured by the plurality of sensors.

9. The method of claim 1, wherein identifying the item comprises:
   identifying a motion of the item based on the sensor data.

10. The method of claim 1, further comprising:
    transmitting the weight of the item to the computing server system.

11. A non-transitory computer-readable medium storing instructions that, when executed by a processor, cause the processor to perform operations comprising:

detecting a location of a user within a region based on sensor data captured by a plurality of sensors of a weight detection system;

determining that the user is within a threshold distance of a computing device of the weight detection system based on the detected location of the user;

responsive to determining that the user is within the threshold distance of the computing device, activating the computing device to measure a weight of an item;

weighing an item using the computing device;

identifying the item based on the weight of the item and based on an image captured by a camera of the weight detection system; and transmitting identifying information of the item to a computing server system of the of the weight detection system via a communication network.

12. The computer-readable medium of claim 11, wherein determining that the user is within the threshold distance of the computing device comprises:

determining that the user is within the threshold distance of the computing device for a threshold period of time.

13. The computer-readable medium of claim 11, wherein the region is a selected area within a store.

14. The computer-readable medium of claim 13, wherein the selected area within the store is a visually-designated area within the store.

15. The computer-readable medium of claim 11, wherein the plurality of sensors comprises a weight sensor or an infrared sensor.

16. The computer-readable medium of claim 11, wherein detecting the location of the user comprises:

applying a visual recognition algorithm to an image captured by a camera.

17. The computer-readable medium of claim 11, wherein the computing device is a device that is coupled to a shopping cart.

18. The computer-readable medium of claim 11, the operations further comprising:

identifying the user based on the sensor data captured by the plurality of sensors.

19. The computer-readable medium of claim 11, wherein identifying the item comprises:

identifying a motion of the item based on the sensor data.

20. The computer-readable medium of claim 11, the operations further comprising:

transmitting the weight of the item to the computing server system.

* * * * *